(12) United States Patent
Hong et al.

(10) Patent No.: US 6,943,860 B2
(45) Date of Patent: Sep. 13, 2005

(54) LIQUID CRYSTAL DISPLAY

(75) Inventors: Seung Ho Hong, Kyoungki-do (KR);
Jung Ho Ma, Kyoungki-do (KR);
Seong Wook Shin, Kyoungki-do (KR);
Sang Un Choi, Kyoungki-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/714,221

(22) Filed: Nov. 14, 2003

(65) Prior Publication Data

US 2004/0125276 A1 Jul. 1, 2004

(30) Foreign Application Priority Data

Dec. 31, 2002 (KR) ................................ 10-2002-0087686

(51) Int. Cl.[7] ........................ G02F 1/1343; G02F 1/1335
(52) U.S. Cl. ........................... 349/139; 349/96; 349/117
(58) Field of Search ................................ 349/139, 106, 349/96–103, 117–119

(56) References Cited

U.S. PATENT DOCUMENTS

| | | | | |
|---|---|---|---|---|
| 5,440,413 A | * | 8/1995 | Kikuchi et al. | 349/118 |
| 6,023,317 A | * | 2/2000 | Xu et al. | 349/120 |
| 6,229,589 B1 | * | 5/2001 | Koma | 349/139 |
| 6,469,762 B1 | * | 10/2002 | Hong et al. | 349/123 |
| 6,509,944 B2 | * | 1/2003 | Koma et al. | 349/139 |
| 2002/0159012 A1 | * | 10/2002 | Yamada | 349/122 |

* cited by examiner

Primary Examiner—Dung T. Nguyen
(74) Attorney, Agent, or Firm—Ladas & Parry LLP

(57) ABSTRACT

Disclosed is an LCD having liquid crystal molecules that lie at a predetermined direction around a valley formed in an upper substrate of the LCD in order to prevent creation of an unadjustable disclination line. The LCD comprises an upper substrate, a lower substrate and a plurality of slits formed in a pixel region of the lower substrate. Each of the slits has a minute distance to the adjacent one of the slits. A valley is formed in a color filter of the upper substrate covered with a transparent electrode, and has a predetermined angle with respect to the slits. Vertical alignment material is formed in opposite faces of the upper and lower substrates. A liquid crystal layer is injected between the upper and lower substrates. Polarizers are arranged in outer faces of the upper and lower substrates, and have transmission axes, which are perpendicular to each other.

8 Claims, 5 Drawing Sheets

LIQUID CRYSTAL DISPLAY

BACKGROUND OF THE INVENTION

1. Field of the Invention

The present invention relates to a Liquid Crystal Display (LCD), and more particularly to an LCD which has slits formed on a transparent electrode in a pixel region of a lower substrate at a minute gap and at least one valley formed in a color filter of an upper substrate at a predetermined angle with respect to the slits in order to minimize creation of a disclination lines.

2. Description of the Prior Art

In general, an LCD comprises upper and lower substrates and a liquid crystal layer injected between the upper and lower substrates, in which light transmission is adjusted by adjusting the intensity of an electric field-applied to the liquid crystal layer.

Many LC alignments are used to make LC Display. One of these alignments is the vertical alignment of liquid crystal. In order to improve the viewing angle characteristics, this vertical alignment structure needs several domains that align LCs in different directions. Therefore, this structure is used with slits or protrusions.

However, the above vertical alignment structure, in which slits or protrusions must be formed in the upper or lower substrate, has a problem in that it requires more masks than a structure according to the Twisted Nematic (TN) technique.

Accordingly, in order to overcome the problem described above, a valley is formed in a color filter portion of the upper substrate to be used in driving liquid crystal in a recently utilized method.

Where a valley 42 is formed in a color filter portion of the upper substrate as above, however, the electric field is oriented in opposite to the orientation of liquid crystal molecules 10 so that the liquid crystal molecules 10 are oriented parallel with the valley 42 instead of being oriented perpendicular to the valley 42.

Further, since the liquid crystal molecules 10 are oriented parallel with the valley 42 in the above situation, the liquid crystal molecules 10 may lie along two random directions, thereby potentially creating an unadjustable disclination line 50 in a middle portion of the liquid crystal molecules aligned in both directions.

SUMMARY OF THE INVENTION

Accordingly, the present invention has been made to solve the above-mentioned problems occurring in the prior art, and an object of the present invention is to provide an LCD having liquid crystal molecules that lie at a predetermined direction around a valley formed in an upper substrate of the LCD in order to prevent creation of unadjustable disclination lines.

In order to accomplish this object, there is provided a liquid crystal display comprising: an upper substrate; a lower substrate; a plurality of slits formed in a pixel region of the lower substrate, each of the slits having a minute gap from adjacent one of the slits; at least one valley formed in a color filter of the upper substrate covered with a transparent electrode, and having a predetermined angle with respect to the slits; vertical alignment material formed in opposite faces of the upper and lower substrates; a liquid crystal layer injected between the upper and lower substrates; and polarizers arranged in outer faces of the upper and lower substrates, and having transmission axes which are perpendicular to each other.

In the liquid crystal display, the slits formed in the lower substrate are arranged with respect to the valley formed in the upper substrate at an angle of about 0 to 90 degrees, and preferably, about 0 to 45 degrees. The slits formed in the lower substrate have a width within about 5 $\mu$m, and the valley formed in the upper substrate has a width of about 5 to 20 $\mu$m.

In the liquid crystal display, the slits formed in the lower substrate and the valley formed in the upper substrate are arranged preferably in a zigzag or crossed configuration to define multiple domains.

The liquid crystal display of the invention may further comprise uniaxial or biaxial phase compensation plates between the lower substrate and one of the polarizers and between the upper substrate and the other one of the polarizers, wherein the uniaxial phase compensation plate has an Rth value ranging from about 40 to 800 nm, and the biaxial phase compensation plate has an Rth value ranging from about 150 to 200 nm.

In the liquid crystal display, the liquid crystal layer has a thickness of about 2 to 6 $\mu$m, multiplication of the liquid crystal layer thickness and index of refraction anisotropy has a value of about 200 to 500 nm, and the liquid crystal has negative dielectric anisotropy ranging from about −2 to −10.

In the liquid crystal display, one of the polarizers arranged in the outer faces of the upper and lower substrates has an angle of about 0 to 90 preferably about 30 to 60 degrees with respect to the slits or the valley.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The following detailed description will present preferred embodiments of a Liquid Crystal Display (LCD) according to the invention with reference to the accompanying drawings.

Figure 1:
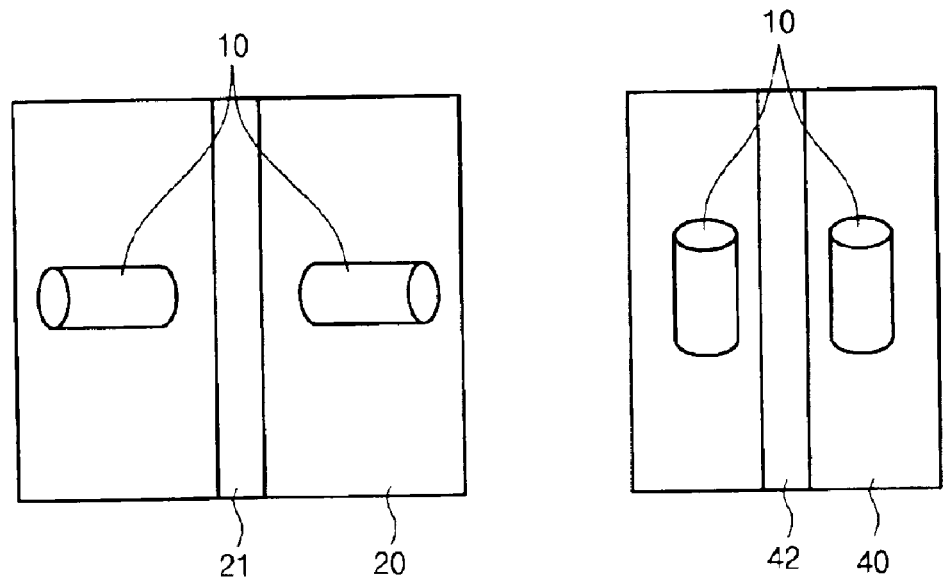
FIG. 1 is a plan view of a lower substrate and a bottom view of an upper substrate for showing the orientation of liquid crystal molecules in a conventional LCD.
Figure 2:
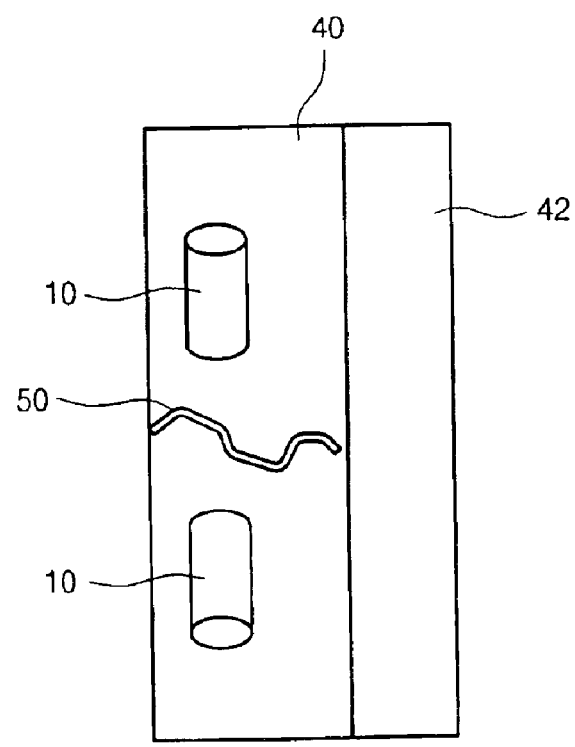
FIG. 2 is a bottom view for showing the orientation of liquid crystal molecules in an upper substrate having a valley structure in a conventional LCD in a case of disclination.
Figure 3:
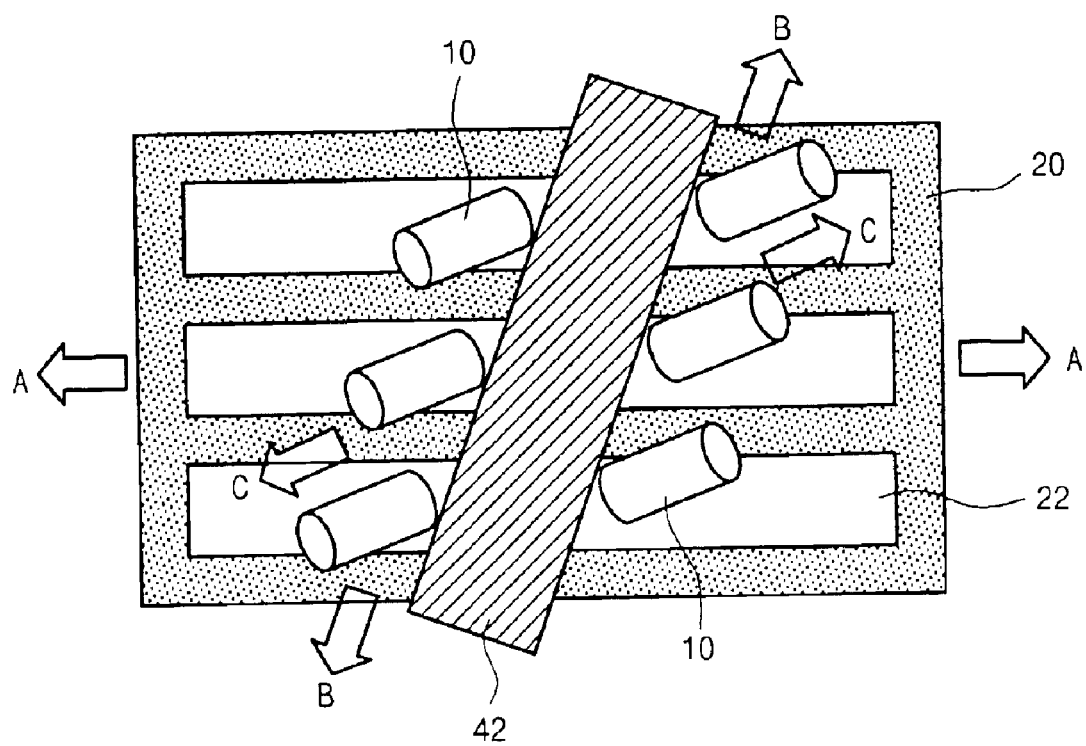
FIG. 3 is a schematic plan view for showing the orientation of liquid crystal molecules in an LCD according to a preferred embodiment of the invention.

FIG. 3 is a schematic plan view for showing the orientation of liquid crystal molecules in an LCD according to a preferred embodiment of the invention. The LCD of the invention is devised using the fact that liquid crystal or liquid crystal molecules 10 lie parallel to slits 22 instead of lying perpendicular to the slits 22, where the slits 22 are formed with a combs shape, which has narrow distances between electrodes. The electrodes are made of transparent conductive material such as Indium Tin Oxide (ITO). These electrodes with combs shape of narrow distances makes LCs parallel to slits instead of perpendicular to slits because of strong LCs interation relative to the electric field.

The LCD of the invention has polarizers arranged over a light source and a liquid crystal panel interposed between the polarizers. A plurality of slits 22 are formed in a pixel region of a lower substrate 20 of the liquid crystal panel, in which adjacent ones of the slits 22 have a minute distance, preferably of about 5 μm or less, and the width of the slits 22 is about 5 μm or less.

An upper substrate or a color filter of the liquid crystal panel is provided with a valley 42, which is oriented at a predetermined angle with respect to the slits 22 in the lower substrate 20.

The slits 22 in the lower substrate 20 are oriented at about 0 to 90 degrees, preferably about 45 degrees or less, with respect to the valley 42 in the upper substrate so that the liquid crystal molecules 10 can be stably laid along the slits 22.

Transparent electrodes are formed before or after the valley 42 is formed in the upper substrate so as to apply a desired value of voltage between the upper substrate and the lower substrate 20. The width of the valley 42 in the upper substrate is formed as small as possible in order to minimize transmissivity. The width has a value of about 3 to 20 μm so as to obtain a predetermined space for allowing movement to the liquid crystal molecules 10.

In fabrication of the liquid crystal panel, vertical alignment material, that is, material such as Polyimide (P/I) for enabling vertical alignment is coated on opposite faces of the upper and lower substrates, in which rubbing may be omitted, and the upper and lower substrates are bonded together via sealant. Then, the liquid crystal molecules 10 are injected into the liquid crystal panel to form a liquid crystal layer. The liquid crystal molecules 10 of the liquid crystal layer have negative dielectric anisotropy in a range of about −2 to −10.

The liquid crystal molecules 10 may be doped with dopant having a pitch of about 8 to 50 μm.

The polarizers attached on outer faces of the upper and the lower substrates have transmission axes that are perpendicular to each other. One of the polarizers is arranged to an angle of about 30 to 60 degrees with respect to the valley 42 in the upper substrate or the slits 22 in the lower substrate 20.

Further, phase compensation plates are selectively placed between the liquid crystal panel and the polarizers. In order to improve image quality, the phase compensation plates have retardation values with respect to x, y and z axes which satisfy the following Equation 1:

$$Rth = [(nx+ny)/2 - nz] \times d \qquad \text{Equation 1,}$$

where z axis is the direction of light propagation and in means the index of refraction of i direction.

The Rth value is in a range of about 40 to 800 nm where uniaxial phase compensation plates are used, and in a range of about 150 to 250 nm where biaxial phase compensation plates are used.

The liquid crystal layer adopted in the liquid crystal panel preferably has a thickness of about 2 to 6 μm, and multi-plication of the liquid crystal layer thickness and Index of Refraction Anisotropy indicated as d×Δn has a value of about 200 to 500 nm.

Figure 4:
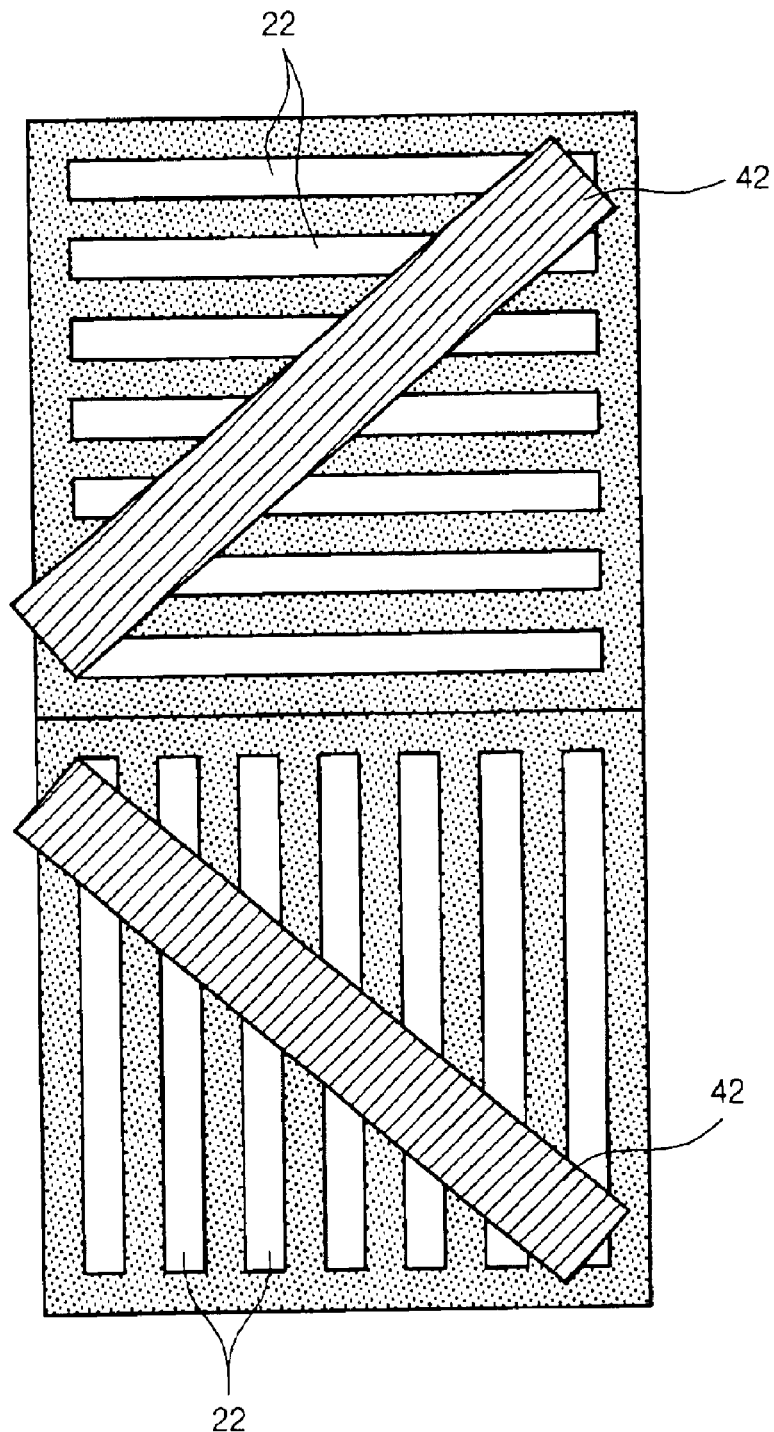
FIG. 4 is a schematic plan view for showing the orientation of liquid crystal molecules according to an embodiment of the invention for multi-domain.

FIG. 4 is a schematic plan view for showing the orientation of liquid crystal molecules where the LCD of the invention comprises multiple domains, in which a lower substrate 20 has two slit groups 22 which are formed in a zigzag or crossed configuration to define four domains.

Therefore, application of voltage to the LCD causes transmissivity to be uniform according to angular field so that wide angular field can be realized.

Figure 5:
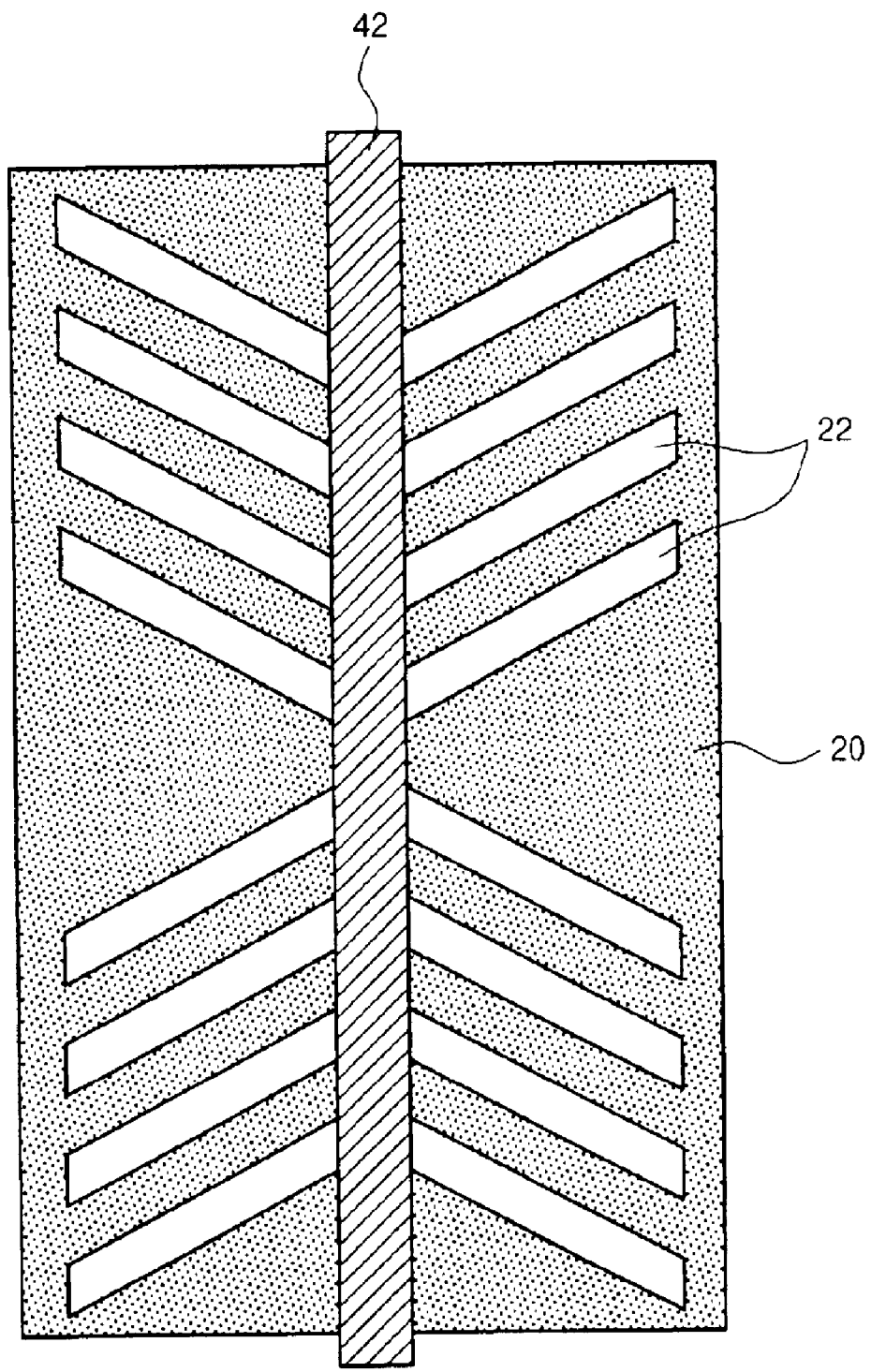
FIG. 5 is a schematic plan view for showing the orientation of liquid crystal molecules according to another embodiment of the invention for multi-domain.

FIG. 5 is a schematic plan view for showing the orientation of liquid crystal molecules according to another embodiment of the invention. As shown in FIG. 5, slit groups 22 are formed in a lower substrate 20 at an angle or angles different from that of a valley 42 in an upper substrate, and suitably divided to define four domains.

Hereinafter the operation of the LCD of the invention of the above construction will be described in reference to FIG. 3.

First, when voltage is applied to the LCD of the above construction, the liquid crystal molecules 10 injected between the upper substrate and the lower substrate 20 are oriented along arrows A by the slits 22 in the lower substrate 20 and along arrows B by the valley 42 in the upper substrate at the same time. Then, the liquid crystal molecules 10 are oriented along arrows C in the vicinity of the valley 42 under the combined influence of both the slits 22 and the valley 42.

As a result, this can minimize creation of a disclination line, which may be produced, as the liquid crystal molecules 10 are oriented along the valley 42.

Figure 6:
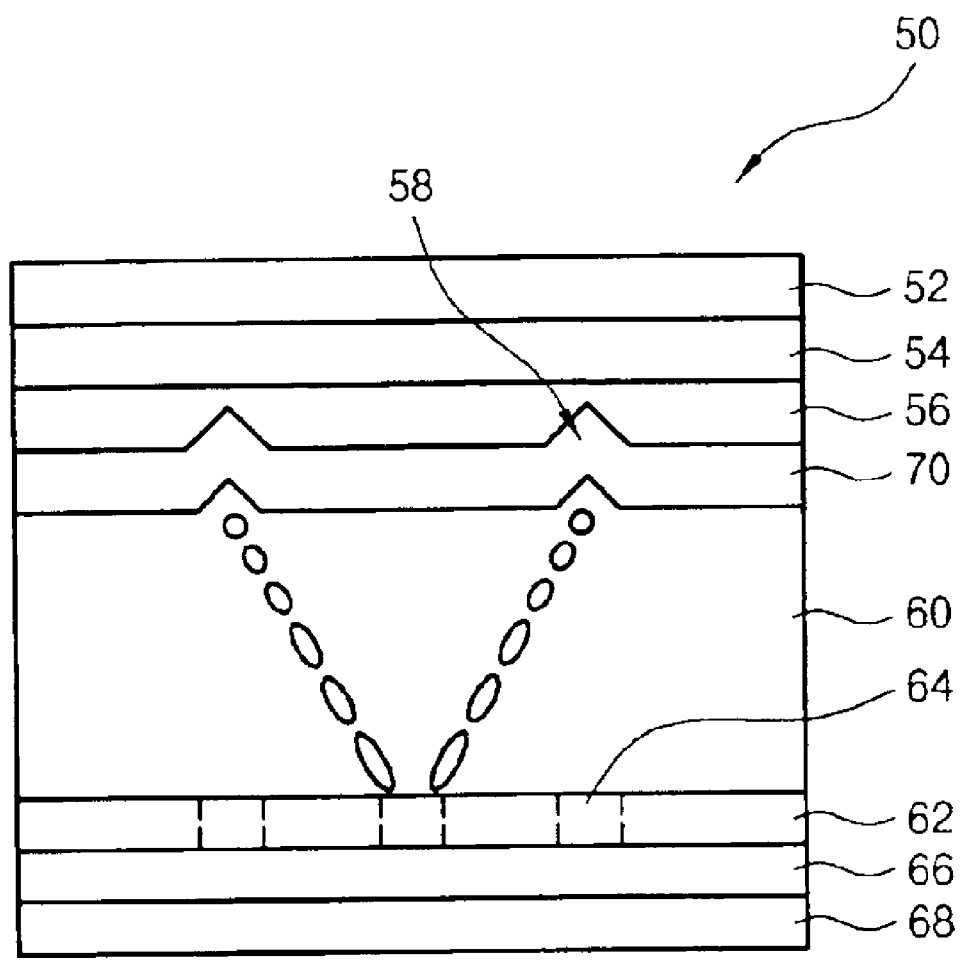
FIG. 6 is a cross sectional side view showing generally the main components of the liquid crystal display according to any embodiment of the present invention.

Shown in FIG. 6 is a cross sectional side view showing generally the main components of the liquid crystal display 50 according to any embodiment of the present invention. The liquid crystal display 50 includes at least an upper substrate 54 and a lower substrate 66. A planar pixel electrode 62 having a plurality of slits 64 is formed in accordance with a predetermined pattern on the lower substrate. A valley 58 is formed in a color filter 56 of the upper substrate 54, which is covered with a transparent electrode 70. The surface of the valley is aligned to have a predetermined angle with respect to the slits 64 of the pixel electrode 62. A vertical alignment material (not shown) is formed on opposite faces of the upper and lower substrates. A liquid crystal layer 60 is formed in between the upper and lower substrates 54, 66. Polarizers 52, 68 are arranged on outer faces of the upper and lower substrates 54, 66. The polarizers 54, 66 have the transmission axes that are perpendicular to each other.

As set forth above, the present invention can stabilize the orientation of liquid crystal, in particular, liquid crystal molecules in a valley vertical alignment mode, having been developed for the purpose of saving the cost of a conventional Vertical Alignment (VA) mode, in order to minimize creation of the disclination line, thereby improving transmissivity.

Further, the vertical alignment mode of the present invention can be applied to a multi-domain structure to improve the viewing angle, thereby enabling wide viewing angle, high brightness, high speed response and high definition display which are required for playing wide LCD TVs, DVDs and so on.

While the present invention has been shown and described in connection with the preferred embodiment, it is to be understood that those skilled in the art can make various modifications and variations to the present invention without departing from the spirit and scope of the appended claims.

What is claimed is:

1. A liquid crystal display comprising:

an upper substrate;

a lower substrate;

a planar pixel electrode having a plurality of slits formed in accordance with a predetermined pattern on the lower substrate;

a valley formed in a color filter of the upper substrate covered with a transparent electrode, and having a predetermined angle with respect to the slits of the pixel electrode;

vertical alignment material formed on opposite faces of the upper and lower substrates;

a liquid crystal layer formed in between the upper and lower substrates; and polarizers arranged on outer faces of the upper and lower substrates, and having transmission axes which are perpendicular to each other, wherein one of the polarizers arranged in the outer faces of the upper and lower substrates has an angle of about 30 to 60 degrees with respect to the slits or the valley.

2. The liquid crystal display as set forth in claim 1, wherein the slits formed in the lower substrate are arranged with respect to the valley formed in the upper plate at an angle of about 0 to 90 degrees.

3. The liquid crystal display as set forth in claim 1, wherein the slits formed in the lower substrate are arranged with respect to the valley formed in the upper plate at an angle of about 0 to 45 degrees.

4. The liquid crystal display as set forth in claim 1, wherein the slits formed in the lower substrate have a width within about 5 $\mu$m, and the valley formed in the upper substrate has a width of about 5 to 20 $\mu$m.

5. The liquid crystal display as set forth in claim 1, wherein the slits formed in the lower substrate and the valleys formed in the upper substrate are arranged in a zigzag or crossed configuration to define multiple domains.

6. The liquid crystal display as set forth in claim 1, further comprising uniaxial or biaxial phase compensation plates between the lower substrate and one of the polarizers and between the upper substrate and the other one of the polarizers, wherein the uniaxial phase compensation plate has an Rth value ranging from about 40 to 800 nm, and the biaxial phase compensation plate has an Rth value ranging from about 150 to 200 nm.

7. The liquid crystal display as set forth in claim 1, wherein the liquid crystal layer has a thickness of about 2 to 6 $\mu$m, and multiplication of the liquid crystal layer thickness and index of refraction anisotropy has a value of about 200 to 500 nm.

8. The liquid crystal display as set forth in claim 1, wherein the liquid crystal has negative dielectric anisotropy ranging from about −2 to −10.

* * * * *